(12) United States Patent
Appleton et al.

(10) Patent No.: US 10,659,099 B1
(45) Date of Patent: May 19, 2020

(54) PAGE SCANNING DEVICES, COMPUTER-READABLE MEDIA, AND METHODS FOR BLUETOOTH PAGE SCANNING USING A WIDEBAND RECEIVER

(71) Applicant: Samsung Electronics Co., Ltd., Suwon-si, Gyeonggi-do (KR)

(72) Inventors: Ian Appleton, Letchworth (GB); Donald Guy, Ely (GB); Michael Cowell, Cambridge (GB); Fei Tong, Bassingbourn (GB)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/217,310

(22) Filed: Dec. 12, 2018

(51) Int. Cl.
 *H04B 1/7156* (2011.01)
 *H04B 1/7136* (2011.01)
(52) U.S. Cl.
 CPC ......... *H04B 1/7136* (2013.01); *H04B 1/7156* (2013.01); *H04B 2001/71362* (2013.01); *H04B 2001/71563* (2013.01)
(58) Field of Classification Search
 CPC ............... H04B 1/7136; H04B 1/7143; H04B 1/71362; H04B 1/7156; H04B 2001/71563; H04B 2001/71566; H04B 2001/71362
 See application file for complete search history.

(56) References Cited

U.S. PATENT DOCUMENTS

| | | | | |
|---|---|---|---|---|
| 5,818,885 A | * | 10/1998 | Kim | H04B 1/7156 375/354 |
| 6,876,691 B1 | * | 4/2005 | Roberts | H04B 1/7156 375/133 |
| 7,345,716 B2 | * | 3/2008 | Chae | G02F 1/134363 349/48 |
| 7,349,381 B1 | * | 3/2008 | Clark | H04B 1/7156 370/350 |
| 7,640,123 B2 | | 12/2009 | Ibrahim et al. | |
| 7,978,748 B2 | * | 7/2011 | Kaiser | H04B 1/7156 375/132 |
| 8,190,388 B2 | | 5/2012 | Ibrahim et al. | |
| 8,447,252 B2 | | 5/2013 | Bagge et al. | |
| 8,817,717 B2 | | 8/2014 | Ly-Gagnon et al. | |
| 8,849,213 B2 | | 9/2014 | Jones et al. | |
| 8,897,706 B1 | | 11/2014 | Lin et al. | |
| 9,160,400 B2 | | 10/2015 | Kerai | |
| 2005/0220229 A1 | * | 10/2005 | Goto | H04B 1/7156 375/343 |

(Continued)

*Primary Examiner* — Sophia Vlahos
(74) *Attorney, Agent, or Firm* — Harness, Dickey & Pierce, P.L.C.

(57) ABSTRACT

A page scanning device configured to generate a sequence mask for an expected frequency hopping sequence, select a first tone among a plurality of detected tones, first determine whether the first tone is included within an expected hop sequence, generate a first tone template in response to determining that the first tone is included within the expected hop sequence, align the first tone template with the plurality of detected tones based on the first tone, second determine whether the first tone template matches the plurality of detected tones, and detect a valid frequency hopping sequence in response to determining that the first tone template matches the plurality of detected tones.

20 Claims, 11 Drawing Sheets

(56) References Cited

U.S. PATENT DOCUMENTS

2006/0045214 A1* 3/2006 Shiina .................. H04L 1/0054
375/341
2008/0293353 A1* 11/2008 Mody ................... H04K 3/226
455/1

* cited by examiner

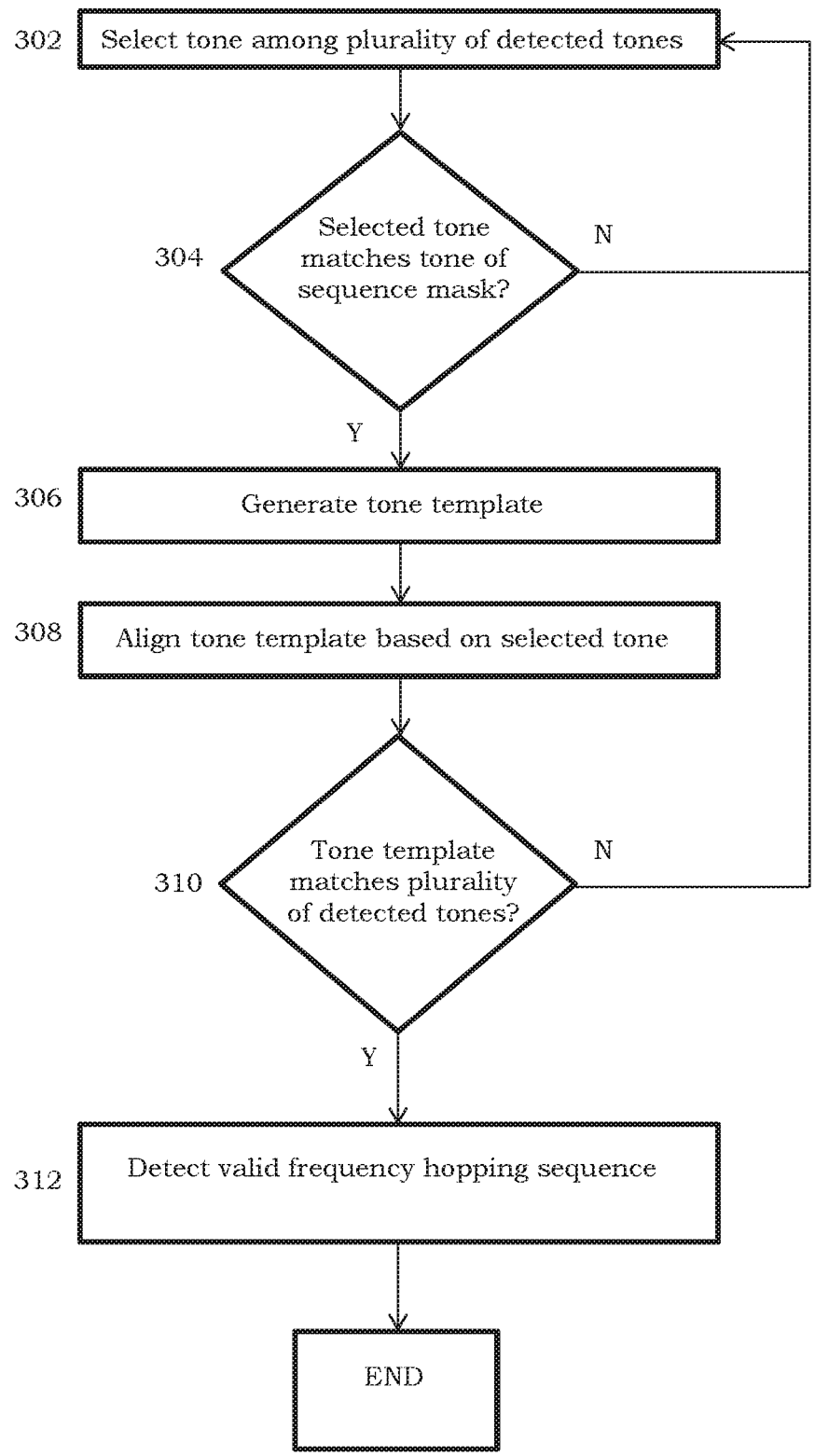

M: tone of expected hop sequence/sequence mask

M: tone of tone template
T: tone of plurality of detected tones
X: match between tone template and plurality of detected tones M: tone of tone template
T: tone of plurality of detected tones
X: match between tone template and plurality of detected tones

PAGE SCANNING DEVICES, COMPUTER-READABLE MEDIA, AND METHODS FOR BLUETOOTH PAGE SCANNING USING A WIDEBAND RECEIVER

BACKGROUND

Some example embodiments relate to detecting a Bluetooth page signal using a wideband receiver.

Bluetooth devices use frequency hopped transmissions to provide resilience to fading and manage radio-frequency (RF) interference. Reception of frequency-hopped transmissions, such as Bluetooth transmissions, is generally accomplished using a narrowband receiver. Such a narrowband receiver includes a frequency-hopping local oscillator that hops independently of a transmitter of the frequency-hopped transmissions. Synchronization is established when a frequency hop of the transmitter coincides with a frequency hop of the local oscillator.

During a Bluetooth page scan, the scanning Bluetooth device hops slowly by staying on one hop frequency for an entire scan window, while the paging Bluetooth device hops quickly by alternating between two trains of 16 channels every 10 ms. When the paging Bluetooth device transmits on the hop frequency the scanning Bluetooth device is listening on, the page packet is received and decoded. If the decoded packet is a paging packet addressed to the scanning Bluetooth device, a connection between the two devices is established.

Page scanning is an ongoing, background operation that is periodically performed by a page scanning device. The power consumed during page scanning increases according to the current drawn by the receiver of the page scanning device while enabled and the length of time that the receiver is enabled.

SUMMARY

According to some example embodiments, page scanning devices, computer-readable media and methods are provided for detecting a Bluetooth page signal using a wideband receiver.

According to some example embodiments, a page scanning device is provided. The page scanning device may include a memory storing computer-readable instructions, and at least one processor coupled to the memory and configured to execute the computer-readable instructions to select a first tone among a plurality of detected tones. The at least one processor is further configured to execute the computer-readable instructions to first determine whether the first tone is included within an expected hop sequence. The at least one processor is further configured to execute the computer-readable instructions to generate a first tone template in response to determining that the first tone is included within the expected hop sequence. The at least one processor is further configured to execute the computer-readable instructions to align the first tone template with the plurality of detected tones based on the first tone. The at least one processor is further configured to execute the computer-readable instructions to second determine whether the first tone template matches the plurality of detected tones. The at least one processor is further configured to execute the computer-readable instructions to detect a valid frequency hopping sequence in response to determining that the first tone template matches the plurality of detected tones.

According to some example embodiments, a non-transitory computer-readable medium is provided. The non-transitory computer-readable medium may store instructions that, when executed by at least one processor, cause the processor to select a first tone among a plurality of detected tones. The instructions, when executed by the at least one processor, further cause the processor to first determine whether the first tone is included within an expected hop sequence. The instructions, when executed by the at least one processor, further cause the processor to generate a tone template in response to determining that the first tone is included within the expected hop sequence. The instructions, when executed by the at least one processor, further cause the processor to align the tone template with the plurality of detected tones based on the first tone. The instructions, when executed by the at least one processor, further cause the processor to second determine whether the tone template matches the plurality of detected tones. The instructions, when executed by the at least one processor, further cause the processor to detect a valid frequency hopping sequence in response to determining that the tone template matches the plurality of detected tones.

According to some example embodiments, a method performed by a page scanning device is provided. The method includes selecting a first tone among a plurality of detected tones. The method further includes first determining whether the first tone is included within an expected hop sequence. The method further includes generating a tone template in response to determining that the first tone is included within the expected hop sequence. The method further includes aligning the tone template with the plurality of detected tones based on the first tone. The method further includes second determining whether the tone template matches the plurality of detected tones. The method further includes detecting a valid frequency hopping sequence in response to determining that the tone template matches the plurality of detected tones.

BRIEF DESCRIPTION OF THE DRAWINGS

Some example embodiments will be more clearly understood from the following detailed description taken in conjunction with the accompanying drawings in which:

FIG. 3 is a flowchart of a method of detecting a Bluetooth paging signal, according to some example embodiments.

DETAILED DESCRIPTION

Figure 1:
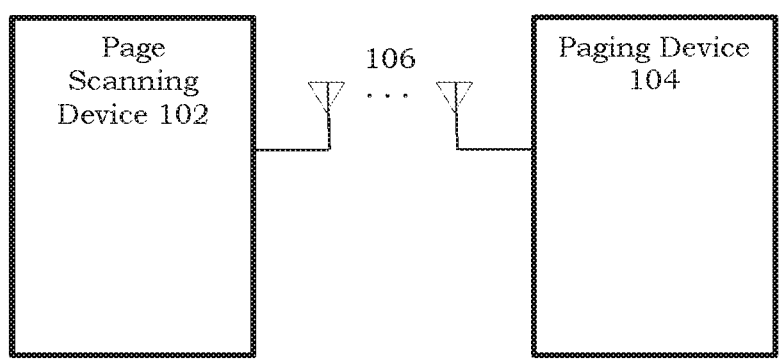
FIG. 1 is a block diagram of a wireless communication network 100, according to some example embodiments.

FIG. 1 is a block diagram of a wireless communication network 100, according to some example embodiments. Referring to FIG. 1, the wireless communication network 100 may include a page scanning device 102 and a paging device 104 that communicate via a Bluetooth network 106. Although the wireless communication network 100 described herein includes a single page scanning device 102 and a single paging device 104, according to some example embodiments, the wireless communication network 100 may include several page scanning devices and several paging devices. Although the discussion herein refers to a Bluetooth network 106, some example embodiments may include another type of network in which page scanning is performed.

According to some example embodiments, the page scanning device 102 and the paging device 104 may correspond to any device that may establish a Bluetooth pairing through the use of paging messages. For example, the page scanning device 102 and the paging device 104 may each correspond to a smart phone, a mobile phone, a tablet computer, a personal digital assistant (PDA), a wireless peripheral device, etc. Wireless peripheral devices may include a keyboard, a mouse, a speaker, an earpiece, a headset, a television, a monitor, etc.

According to some example embodiments, the page scanning device 102 and the paging device 104 may be paired Bluetooth devices the synchronization of which is established using page scans. Specifically, the paging device 104 transmits paging signals that are received by the page scanning device 102 via the Bluetooth network 106. The operations performed by the page scanning device 102 to detect the paging signals will be discussed further below in association with FIGS. 2-3.

Figure 2:
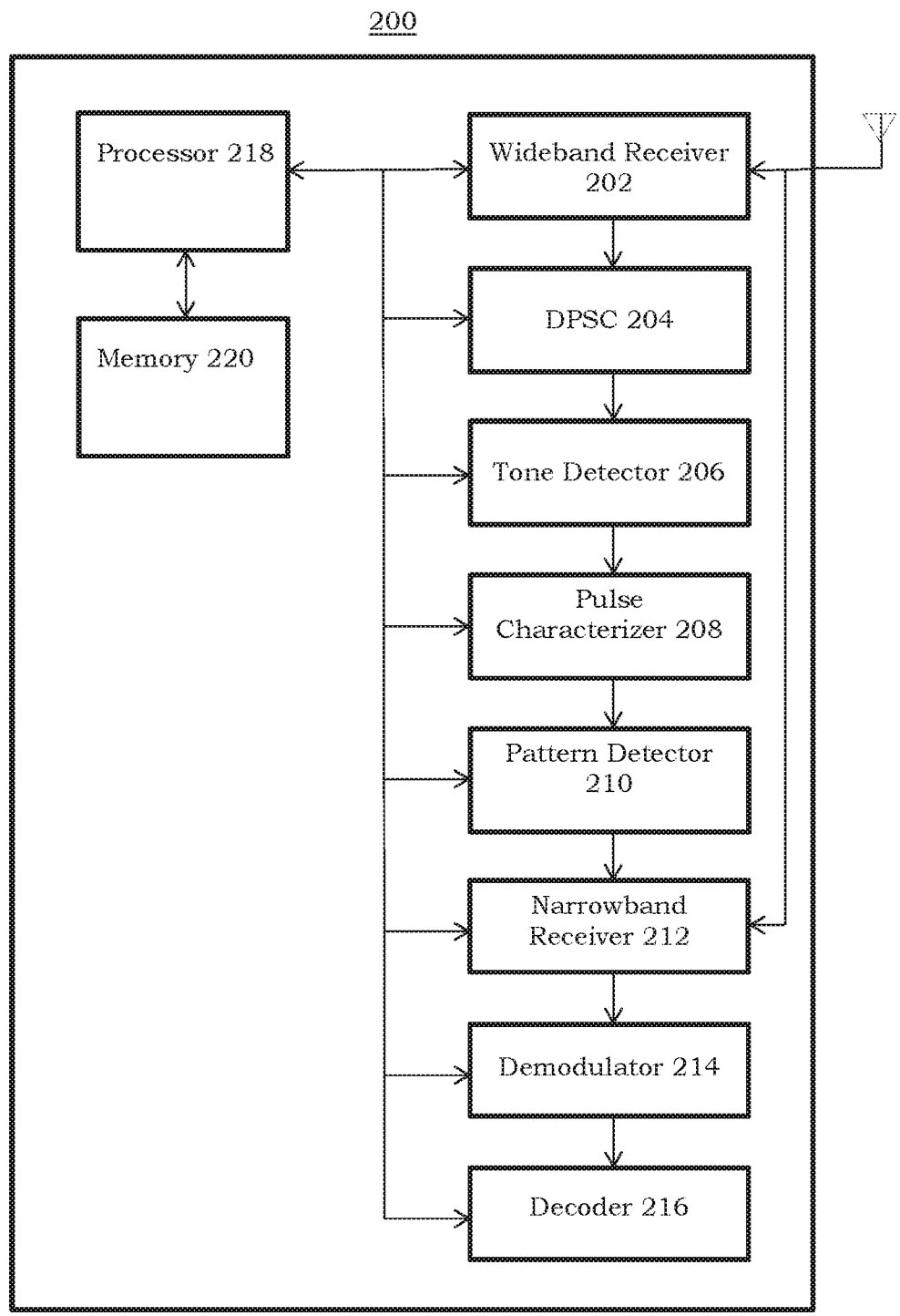
FIG. 2 is a block diagram of a page scanning device 200, according to some example embodiments.

FIG. 2 is a block diagram of a page scanning device 200, according to some example embodiments. According to some example embodiments, the page scanning device 200 of FIG. 2 is similar to or the same as the page scanning device 102 of FIG. 1.

Referring to FIG. 2, the page scanning device 200 may include a wideband receiver 202, a dynamic power spectra calculator (DPSC) 204, a tone detector 206, a pulse characterizer 208, a pattern detector 210, a narrowband receiver 212, a demodulator 214, a decoder 216, at least one processor 218, and a memory 220. According to some example embodiments, operations described herein as being performed by any or all of the page scanning device 200, the wideband receiver 202, the DPSC 204, the tone detector 206, the pulse characterizer 208, the pattern detector 210, the narrowband receiver 212, the demodulator 214 and the decoder 216 may be performed by at least one processor executing program code that includes instructions corresponding to the operations (e.g., processor 218). The instructions may be stored in a memory of the page scanning device 200 (e.g., memory 220). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The wideband receiver 202 may receive radio frequency (RF) signals from an antenna. According to some example embodiments, the RF signals may correspond to the whole or a part of the 2.4 GHz the industrial, scientific and medical (ISM) band. The wideband receiver 202 may amplify, down-convert and digitize the RF signals to obtain complex samples. According to some example embodiments, the complex samples may be filtered and converted to a sample rate appropriate for processing by the DPSC 204.

According to some example embodiments, the bandwidth represented by the complex samples is 80 MHz or greater such that Bluetooth channels 1-79 may be monitored continuously for wideband processing. For example, each Bluetooth channel may be associated with 1.0 MHz in bandwidth. As discussed above, in conventional page scanning devices, paging signals are received using a narrowband receiver that hops slowly by staying on one hop frequency for an entire scan window. By using a wideband receiver, the frequency and timing of a Bluetooth paging signal may be determined without waiting for a transmitted hop sequence to arrive at a particular narrowband reception frequency. This may also decrease the time used to perform synchronization and decrease the duration for which the wideband receiver 202 is used. The power consumed during page scanning increases according to the current drawn by the receiver of the page scanning device while enabled and the length of time that the receiver is enabled. Thus, by using a wideband receiver rather than a narrowband receiver, page scanning latency and energy consumption are reduced.

According to some example embodiments, both narrowband and wideband receivers may be used based on a determination of the radio environment using an analysis of the wideband RF signal. For example, when excessive interference exists in the channel, use of the wideband receiver may be reduced or eliminated, instead relying on the narrowband receiver. According to some example embodiments, when excessive interference exists in the channel, the wideband receiver may receive a subset (e.g., 20 MHz-40 MHz) of the 80 MHz RF signal received when less interference is detected. According to some example embodiments, when excessive interference exists in the channel, the wideband receiver may receive several 20 MHz subsets of the 80 MHz RF signal with automatic gain control set for each subset. After receiving and processing the RF signals, the wideband receiver 202 provides the complex samples to the DPSC 204.

The DPSC 204 receives the complex samples and performs spectrum analysis to produce a sequence of spectrum estimates of the received RF signals. According to some example embodiments, the spectrum analysis may involve using Fourier techniques, such as fast Fourier transform (FFT). The sequence of estimates of the power spectrum represents time-frequency data that may be used to detect the presence or absence of tones at specific frequencies.

According to some example embodiments, the sequence of spectrum estimates may take the form of a spectrogram. According to some example embodiments, the DPSC 204 may use a discrete Fourier transform to identify tones and tone-like signals.

The frequency resolution of each spectrum estimate in the sequence of estimates corresponds to the duration of the input signal used to generate the spectrum estimate. According to some example embodiments, the duration of the input signal corresponds to a number of samples of the input signal supplied to the DPSC 204. According to some example embodiments, the sequence of estimates of the power spectrum of the received RF signals may be obtained using a number of FFT points ($N_{FFT}$) of 256 and a sampling frequency of 80 mega-samples per second (Msps). Each spectrum estimate thus obtained has a spectrum resolution of 0.3125 MHz, representing the finest resolution for an input signal corresponding to 256 samples. According to some example embodiments, the statistical variance of each spectral estimate may be reduced by averaging successive spectra from shorter FFTs. However, by so reducing the statistical variance of each spectral estimate, the resolution of the spectrum estimate is also reduced for a given duration of the input signal. According to some example embodiments, the sequence of estimates of the power spectrum of the received RF signals may be obtained using an $N_{FFT}$ value of 256, a sampling frequency of 80 (Msps), a spectrum resolution (also referred to herein as "frequency resolution") of 0.3125 MHz, a 3.2 microsecond time interval represented by each spectral estimate (TEst), and block averaging up to 4 successive spectra. After the DPSC 204 produces the sequence of estimates, the DPSC 204 provides the sequence of estimates to the tone detector 206.

The tone detector 206 receives the sequence of estimates as a series of time-varying spectrum estimates and generates decision information indicating whether a tone (also referred to herein as "narrowband energy") has been detected. According to some example embodiments, the decision information may be logical values obtained through channel partitioning and peak determination.

The tone detector 206 performs channel partitioning by determining where channel boundaries fall in relation to available spectrum data such that spectral energy may be correctly assigned to a channel. For example, each Bluetooth channel may be associated with 1.0 MHz in bandwidth. According to some example embodiments, channel partitioning may also involve a sample rate conversion process to convert spectrum data with frequency samples spaced at a particular frequency resolution to another frequency resolution.

The tone detector 206 performs peak determination by identifying peaks in the spectrum estimates corresponding to respective tones. According to some example embodiments, the spectrum resolution is sufficiently coarse such that spectrum estimates of a Gaussian frequency shift keying (GFSK) modulated Bluetooth signal would be similar to or the same as spectrum estimates of a tone.

According to some example embodiments, the tone detector 206 identifies peaks in the spectrum estimates by comparing a summation of the total energy contained within a defined frequency range around an allowable tone with the total energy of all frequencies over which the spectrum estimates are determined. For example, an allowable tone may be a tone characteristic of a Bluetooth carrier. If the allowable tone energy is a sufficient fraction of the total energy, a peak is identified.

According to some example embodiments, the tone detector 206 identifies peaks in the spectrum estimates by comparing a summation of the total energy contained within a frequency range around an allowable tone with the total energy in off-channel frequency ranges. For example, an allowable tone may be a tone characteristic of a Bluetooth carrier and off-channel frequency ranges may be frequency ranges in which Bluetooth spectral energy is not expected. If the on-channel energy is a sufficient fraction of the total off-channel energy, a peak is identified.

According to some example embodiments, the tone detector 206 identifies peaks in the spectrum estimates by determining local maxima in the spectrum estimates sufficiently sharp to constitute tones. A determined quantity of tones may be identified as peaks.

According to some example embodiments, the decision information generated by the tone detector 206, using the channel partitioning and peak determination discussed above, includes a list of rising and falling edges corresponding to detected tones (also referred to herein as "frequencies" and "hops"). The edges may each be associated with corresponding frequency and time parameters. The list of edges, along with the corresponding frequency and time parameters are then provided to the pulse characterizer 208. According to some example embodiments, the tone detector 206 may provide intensity values to the pulse characterizer 208, as discussed further below.

The pulse characterizer 208 receives the list of edges and corresponding frequency and time parameters and reformats the information into a more compact form. According to some example embodiments, the pulse characterizer 208 uses a correlation algorithm to reformat the information. Such a compact format may improve flexibility of later processing. For example, the information may be processed in blocks using reduced memory resources. According to some example embodiments, heuristic data clean up algorithms may also be used to mitigate effects from noise or other deficiencies in the tone detection.

According to some example embodiments, each tone may be represented as an entry in a table in association with the frequency, or channel, of the tone, the tone start time and the tone duration. As discussed in association with FIG. 4B below, for example, the reformatted information may take the form of a time-frequency grid and the presence or absence of a tone may be represented in each cell of the grid. According to some example embodiments, instead of indicating the presence or absence of a tone, the reformatted information includes an intensity value for the tone. The intensity value functions as a probability that the time-frequency block includes a tone. The resolution of the frequency axis of the grid may correspond to the channel spacing used in Bluetooth paging signals (e.g., the resolution of the frequency axis may be 1.0 MHz). According to some example embodiments, the resolution of the frequency axis of the grid may be less than 1.0 MHz. According to some example embodiments, the resolution of the time axis of the grid corresponds to the TEst that is determined based on the FFT resolution, averaging method and/or sampling used by the DPSC 204 to generate the spectrum estimates as discussed above. According to some example embodiments, the TEst defines the precision with which a page message (e.g., paging signal) may be located. Hereinafter, the time duration represented by each cell in the grid (corresponding to the resolution of the time axis of the grid) may be referred to as a tone period.

The pulse characterizer 208 provides the reformatted information (also referred to herein as "time-frequency data") to the pattern detector 210. The time-frequency data includes a plurality of detected tones. According to some example embodiments, the page scanning device 200 may not include the pulse characterizer 208. Instead, the tone detector 206 may provide the list of edges and corresponding frequency and time parameters to the pattern detector 210 without reformatting. According to some example embodiments, the time-frequency data may represent a relatively large amount of signal data previously collected over a relatively long period of time. According to some example embodiments, the time-frequency data may represent a relatively small amount of signal data continuously collected in real-time.

The pattern detector 210 receives the time-frequency data from the pulse characterizer 208. The pattern detector 210 determines, receives and/or obtains an expected hop sequence of the paging signal. According to some example embodiments, the expected hop sequence is a function of the Bluetooth address of the page scanning device 200. The expected hop sequence may include two trains of 16 frequencies (e.g., tones), each frequency of the expected hop sequence occurring only once within the expected hop sequence. The determination of an expected hop sequence using a Bluetooth address of a page scanning device would be known by a person having ordinary skill in the art, further description thereof is omitted. Accordingly, the pattern detector 210 may determine the expected hop sequence using the Bluetooth address of the page scanning device 200. Hereinafter, the term "sequence mask" may be used to refer to the expected hop sequence. According to some example embodiments, the sequence mask represents a list of frequencies (e.g., tones) in the expected hop sequence, an order in which each listed frequency is transmitted, and timing information of when each listed frequency is transmitted.

According to some example embodiments, the pattern detector 210 may also validate each tone of the plurality of detected tones included in the time-frequency data received from the pulse characterizer 208. For example, the pattern detector 210 may determine whether the duration of each tone is within a threshold range. The threshold range may correspond to the length of a page packet+/−the sampling interval. If the duration of a tone is within the threshold range, the tone is determined to be valid. Otherwise, if the duration of the tone is outside of the threshold range, the tone is determined to be invalid (e.g., interference). According to some example embodiments, invalid tones of the plurality of detected tones are discarded.

Once the sequence mask is generated, the pattern detector 210 may select a tone within the plurality of detected tones. The tone may be selected, defined and/or determined according to one or more criteria (e.g., based on priorities of a given application). For example, the pattern detector 210 may select a tone detected earliest in time among previously unselected tones. The pattern detector 210 may compare the selected tone to the tones of the sequence mask to determine if any of the tones of the sequence mask match the selected tone (e.g., determine whether the selected tone is included within the expected hop sequence).

If the pattern detector 210 determines that the selected tone does not match any tone of the sequence mask, the pattern detector 210 may discard the selected tone. After discarding the selected tone, the pattern detector 210 may select a new tone as discussed above. If the pattern detector 210 determines that the selected tone matches a tone of the sequence mask ("the matched tone"), the pattern detector 210 may generate a tone template based on the selected tone and the sequence mask (e.g., generate a tone template in response to determining that the first tone is included within the expected hop sequence). According to some example embodiments, the tone template may include the matched tone, and one or more other tones of the sequence mask, the tones of the tone template being aligned according to the order and timing of tones in the sequence mask. The size of the tone template (e.g., a quantity of sequence mask tones included in the tone template) may be defined, selected and/or determined according to one or more criteria (e.g., priorities of a given application). Additionally, the one or more other tones of the sequence mask included in the tone template may be sequential (e.g., the next three tones following the matched tone) or non-sequential. The one or more other tones of the sequence mask included in the tone template may be defined, selected and/or determined according to one or more criteria (e.g., priorities of a given application).

The pattern detector 210 may align the tone template with the selected tone with respect to the plurality of detected tones. After so aligning the tone template, the pattern detector 210 may compare the tone template with the plurality of detected tones to determine a similarity value.

If the similarity value is greater than a defined threshold, the pattern detector 210 determines the selected tone to be a valid tone corresponding to a valid frequency hopping sequence (also referred to herein as a "valid paging sequence"). Otherwise, if the similarity value is less than or equal to the defined threshold, the pattern detector 210 determines that the selected tone does not correspond to a valid frequency hopping sequence.

According to some example embodiments, when the paging signal to be detected is present, at least some of the plurality of detected tones included in the time-frequency data received from the pulse characterizer 208 corresponds to the tone template. According to some example embodiments, the tones of the sequence mask included in the tone template may be a non-contiguous subset of the tones of the sequence mask (e.g., based on the order of tones in the sequence mask). For example, the plurality of detected tones may not include all tones of the sequence mask due to RF interference, so the use of a larger tone template (e.g., a tone template including more sequence mask tones) may be more reliable and useful in environments in which spurious tones are expected. However, use of a larger tone template may also involve higher page scanning latency and resource consumption (e.g., processor, memory and energy resources). Accordingly, a trade-off exists between reliability and latency/resource consumption associated with tone template size. According to some example embodiments, the page scan window length and the size of the corresponding tone template (e.g., a quantity of tones) may be selected based on a measured signal to noise ratio. According to some example embodiments, the page scan window length and the size of the tone template may be selected based on estimated signal to interference conditions. According to some example embodiments, the tone template may include a single tone (e.g., the matched tone). According to some example embodiments, the quantity of tones included in the tone template may be two or more, and some tones within the tone template may be designated as "don't care" in order to provide resilience against interference at known frequencies.

Upon determining that the selected tone does not correspond to a valid frequency hopping sequence, the pattern detector 210 may discard the selected tone. After discarding the selected tone, the pattern detector 210 may select a new tone as discussed above. According to some example embodiments, the pattern detector 210 continues to select a new tone and determine the similarity value until a valid tone is determined corresponding to a valid frequency hopping sequence.

According to some example embodiments, the new tone may sequentially follow the discarded tone in the plurality of detected tones (e.g., in applications in which the time-frequency data may represent a relatively large amount of signal data previously collected over a relatively long period of time). According to some example embodiments, the new tone may be a most recently detected tone among the plurality of detected tones (e.g., in applications in which the time-frequency data may represent a relatively small amount of signal data continuously collected in real-time). According to some example embodiments, the plurality of detected tones may be processed as discussed above, in parallel. Specifically, a plurality of tone templates may be generated contemporaneously. Each tone template may remain active until the pattern detector 210 determines that the tone template does not correspond to the tone data closely enough to represent a valid frequency hopping sequence and it is discarded. According to some example embodiments, before the pattern detector 210 generates a new tone template for the selected tone, the pattern detector 210 may determine whether the selected tone is included in an active tone template. The pattern detector 210 may only proceed to compare the selected tone to the tones of the sequence mask in the event that the selected tone is not included in an active tone template with appropriate timing.

Comparison of a relatively small number of tones in the plurality of detected tones against the tone template allows the receiver to determine the timing of the scan signal to be received. It is then possible to predict the subsequent frequency hops, so the Bluetooth receiver will be able to receive the paging packet directly rather than having to scan for it. The operations performed by the pattern detector 210 will be discussed further below in association with FIGS. 3 and 4A-4D.

According to some example embodiments, the occurrence and timing of the valid paging sequence is detected using only the time-frequency data (e.g., the reformatted information received from the pulse characterizer 208) and the Bluetooth address of the page scanning device 200. According to some example embodiments, since the valid paging sequence may be detected from a subset of the time samples constituting the paging sequence, the processor 218 may deactivate one or more of the wideband receiver 202, the dynamic power spectra calculator (DPSC) 204, the tone detector 206, the pulse characterizer 208, the pattern detector 210, the narrowband receiver 212, the demodulator 214 and/or the decoder 216 in intervals between blocks of samples used for spectrum measurement during the page message transmission. The resulting duty cycle reduction would reduce the power consumed by the page scanning device 200.

According to some example embodiments, once a valid tone is determined corresponding to a valid paging sequence, the pattern detector 210 outputs a valid sequence indication, along with the Bluetooth channel of the valid tone and an estimate of the timing information of the valid tone (e.g., timing information of a rising edge), to the narrowband receiver 212. The narrowband receiver 212 uses the information provided by the pattern detector 210 to receive a first paging packet corresponding to the valid tone. The narrowband receiver 212 then provides the first paging packet to the demodulator 214 for demodulation. After demodulating the first paging packet, the demodulator 214 provides the demodulated first paging packet to the decoder 216. The decoder 216 then decodes the first paging packet. According to some example embodiments, the demodulator 214 is a Bluetooth demodulator and the decoder 216 is a Bluetooth decoder. According to some example embodiments, as discussed further below in association with FIG. 6, the page scanning device 200 identifies the Bluetooth paging packet using the valid sequence indication without decoding the packet. Since the Bluetooth packet is not decoded, the wideband receiver 202 may be operated discontinuously during the page message transmission to reduce power consumption.

Generally, the hopping pattern in Bluetooth paging signals repeats after 16 packets. Accordingly, the timing and frequency of future packets may be predicted after the first paging packet is decoded. This predictability enables the page scanning device 200 to synchronize with a corresponding paging device using fewer resources (e.g., processor, memory and energy). Additionally, the predictability permits the page scanning device 200 to confirm that the paging message is intended for the page scanning device 200 by verifying that further tones match the expected hop sequence.

Figure 4A:
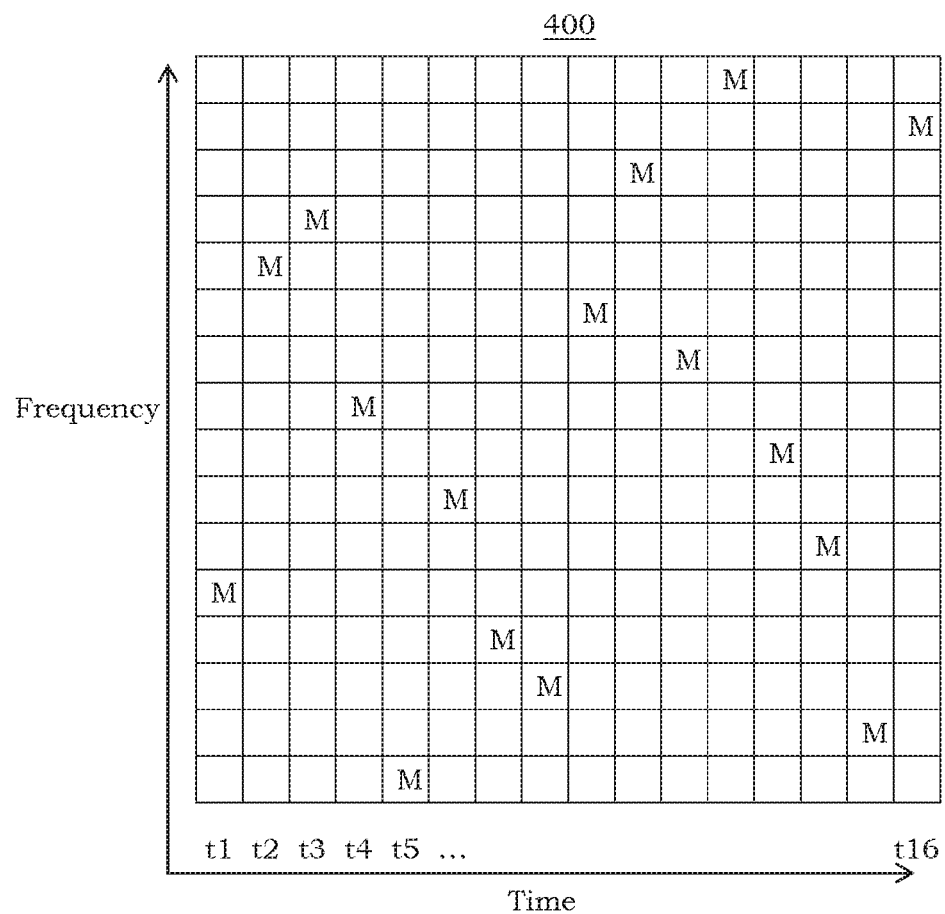
FIG. 4A is a signal diagram illustrating an expected hop sequence/sequence mask, according to some example embodiments.
Figure 4B:
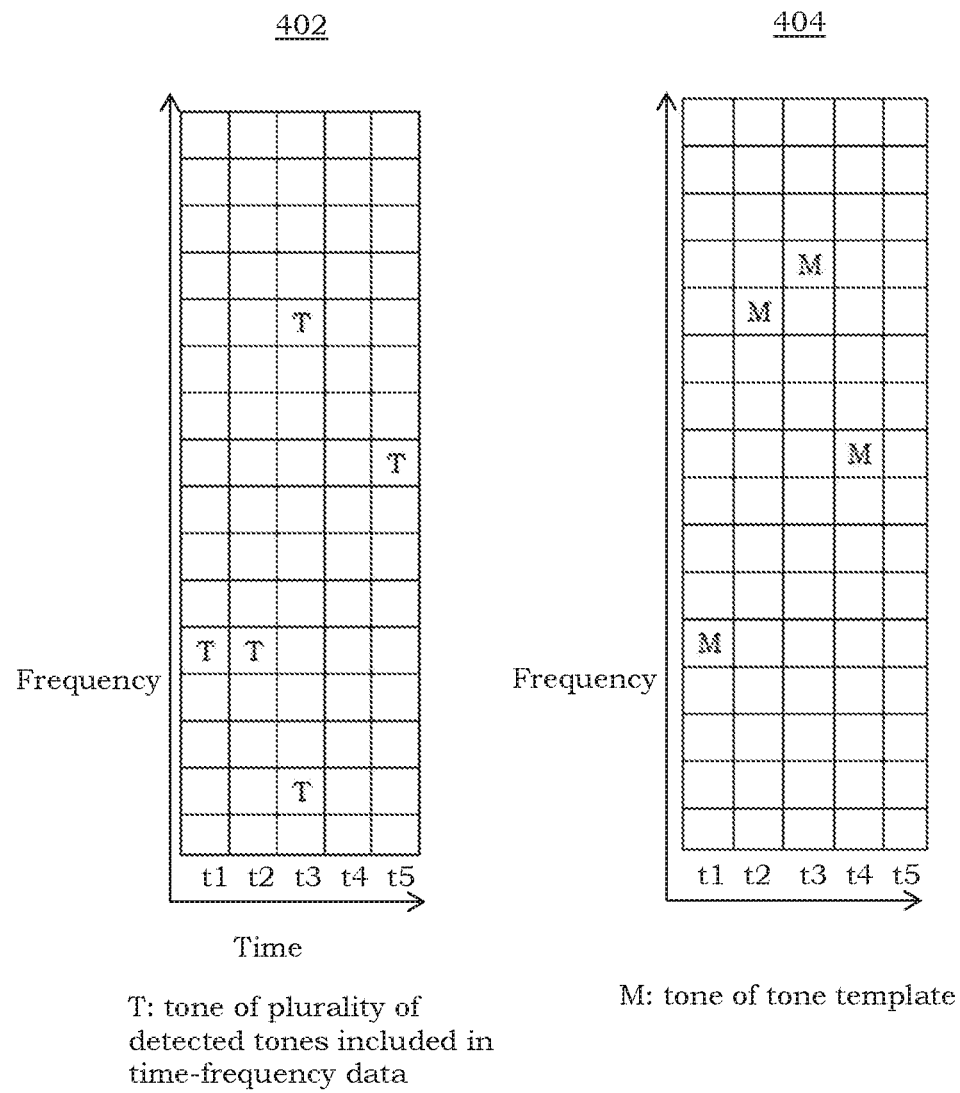
FIG. 4B is a signal diagram illustrating a plurality of detected tones included in time-frequency data and a tone template, according to some example embodiments.
Figure 4C:
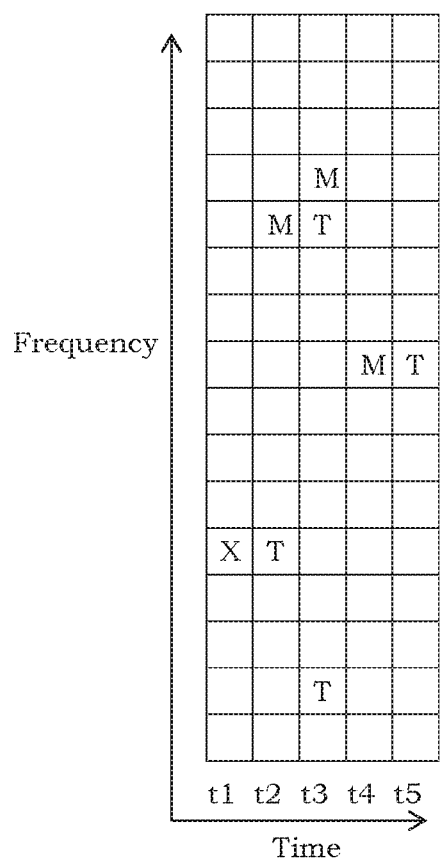
FIG. 4C is a signal diagram illustrating a determination of whether a tone template based on a first selected tone of the plurality of detected tones matches the plurality of detected tones, according to some example embodiments.
Figure 4D:
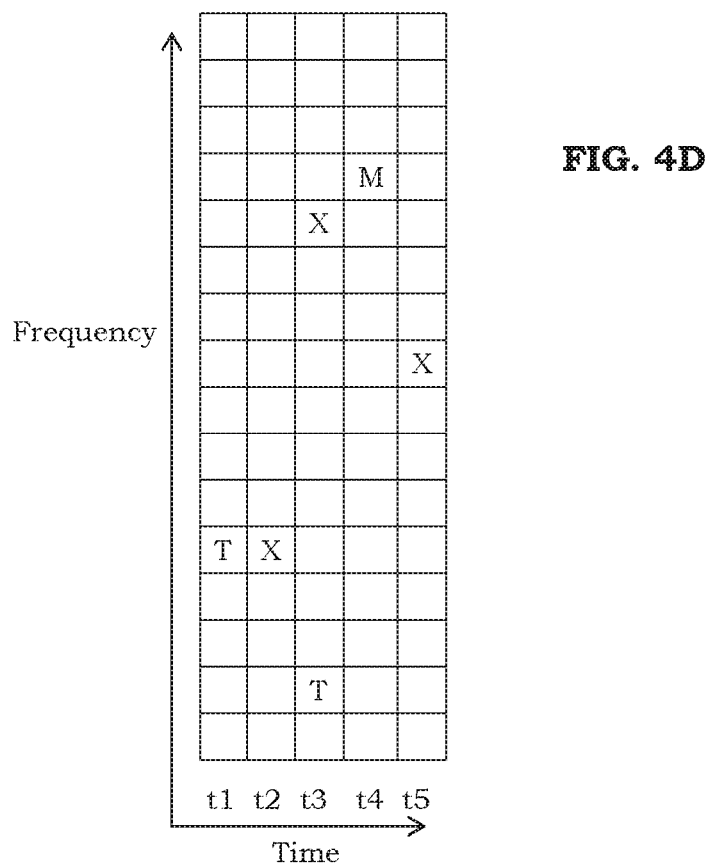
FIG. 4D is a signal diagram illustrating a determination of whether a tone template based on a second selected tone of the plurality of detected tones matches the plurality of detected tones, according to some example embodiments.

FIG. 3 is a flowchart of a method of detecting a Bluetooth paging signal, according to some example embodiments. According to some example embodiments, the method of FIG. 3 is performed by a page scanning device similar to or the same as the page scanning device 200 of FIG. 2. FIG. 3 will be discussed below in association with FIGS. 4A-4D. FIG. 4A is a signal diagram illustrating an expected hop sequence/sequence mask, according to some example embodiments. FIG. 4B is a signal diagram illustrating a plurality of detected tones included in time-frequency data and a tone template, according to some example embodiments. FIG. 4C is a signal diagram illustrating a determination of whether a tone template based on a first selected tone of the plurality of detected tones matches the plurality of detected tones, according to some example embodiments. FIG. 4D is a signal diagram illustrating a determination of whether a tone template based on a second selected tone of the plurality of detected tones matches the plurality of detected tones, according to some example embodiments.

Referring to FIG. 3, in operation 302, a tone may be selected among the plurality of detected tones. In operation 304, the selected tone may be compared to the tones of the sequence mask to determine if any of the tones of the sequence mask match the selected tone. If it is determined that the selected tone does not match any tone of the sequence mask ("No" at operation 304), the selected tone may be discarded and the method returns to operation 302 to select a new tone. If it is determined that the selected tone matches a tone of the sequence mask ("Yes" in operation 304), the method advances to operation 306.

In operation 306, a tone template may be generated based on the selected tone and the sequence mask. Referring to FIG. 4A, a signal diagram illustrating an example expected hop sequence/sequence mask 400 is provided. The sequence mask includes a different tone, or frequency, for each time period (e.g., t1-t16). Although 16 tones are depicted as being included in the sequence mask 400 in this example, according to some example embodiments, the sequence mask 400 would include 32 tones (e.g., two trains of 16 tones). According to some example embodiments, the length of each time period may correspond to a length of a page packet+/−the sampling interval. The example sequence mask depicted may correspond to a 16-channel Bluetooth paging signal. The tone template may include the tone of the sequence mask determined to match the selected tone (the "matched tone"), and one or more other tones of the sequence mask, the tones of the tone template being aligned with respect to one another according to the order and timing of the sequence mask.

Referring to FIG. 3, in operation 308, the tone template may be aligned with the plurality of detected tones based on the selected tone. Referring to FIG. 4B, a signal diagram illustrating an example plurality of detected tones 402 and an example tone template 404 are provided. As discussed above, the plurality of detected tones 402 corresponds to time-frequency data that may be represented as a time-frequency grid, and the presence or absence of a tone may be represented in each cell of the grid. The example plurality of detected tones represents a scan window of five time periods (e.g., t1-t5). Several tones may be detected on different frequencies within the same time period (e.g., time period t3). Additionally, the plurality of detected tones may include one or more time periods in which no valid tone is detected, for example, when tones are invalidated and discarded due to interference (e.g., time period t4). The tones of the example tone template 404 are selected sequentially from the sequence mask 400 to include the next three tones following the matched tone.

Referring to FIGS. 4A and 4B, the tone of the plurality of detected tones 402 associated with time period t1 may be selected as the selected tone in operation 302. In operation 304, the selected tone is compared with the sequence mask 400 to determine that the tone of the sequence mask 400 associated with time period t1 of the sequence mask (the "matching tone") matches the selected tone. The tone template 404 may be generated in operation 306 to include the matching tone as well as the following three tones of the sequence mask 400 (e.g., the tones associated with time periods t2-t4 of the sequence mask).

Referring to FIG. 3, according to some example embodiments, aligning the tone template with the plurality of detected tones includes establishing an association in the time and frequency domains between the position of the selected tone among the plurality of detected tones and the position of the matched tone among the tones of the tone template. So aligned, the time-frequency positions of the tones of the tone template may be compared with corresponding time-frequency positions of the plurality of detected tones to determine a quantity of tones of the tone template for which a corresponding tone exists among the plurality of detected tones (such comparing is discussed further in association with operation 310). Referring to FIGS. 4B and 4C, the tone template 404 may be aligned with the plurality of detected tones 402 as discussed above.

Referring to FIG. 3, in operation 310, a determination is made as to whether the tone template matches the plurality of detected tones. According to some example embodiments, as discussed further in association with FIG. 5A, the determination may include calculating a difference metric between the tone template and the plurality of detected tones, and determining whether the difference metric is greater than a defined threshold. The determination of the difference metric may be based on a binary indication (also referred to herein as a "hard decision input") of whether a tone is found or not found at the particular time and frequency in the plurality of detected tones included in the time-frequency data received from the pulse characterizer 208. According to some example embodiments, the difference metric may be a ratio of a quantity of tones of the tone template not matched with a corresponding tone of the plurality of detected tones, to a quantity of tones in the tone template. According to some example embodiments, the determination may include calculating a hard decision similarity metric between the tone template and the plurality of detected tones. For example, the hard decision similarity metric may be a ratio of a quantity of tones of the tone template successfully matched with a corresponding tone of the plurality of detected tones, to a quantity of tones in the tone template. The determination would likewise involve determining whether the hard decision similarity metric is greater than a defined threshold.

With reference to FIG. 4C, an example alignment is depicted between the plurality of detected tones 402 and the tone template 404 such that time period t1 of the tone template 404 corresponds to time period t1 of the plurality of detected tones 402. With the tone template 404 so aligned, the quantity of tones of the tone template 404 not matched with a corresponding tone of the plurality of detected tones 402 is 3 and the quantity of tones of the tone template 404 is 4. Accordingly, the difference metric for the example alignment of FIG. 4C is ¾ or 0.75. If 0.75 is less than the defined threshold, the tone template 404 is determined to match the plurality of detected tones 402. Otherwise, if 0.75 is greater than or equal to the defined threshold, the tone template 404 is determined to not match the plurality of detected tones.

Figure 5A:
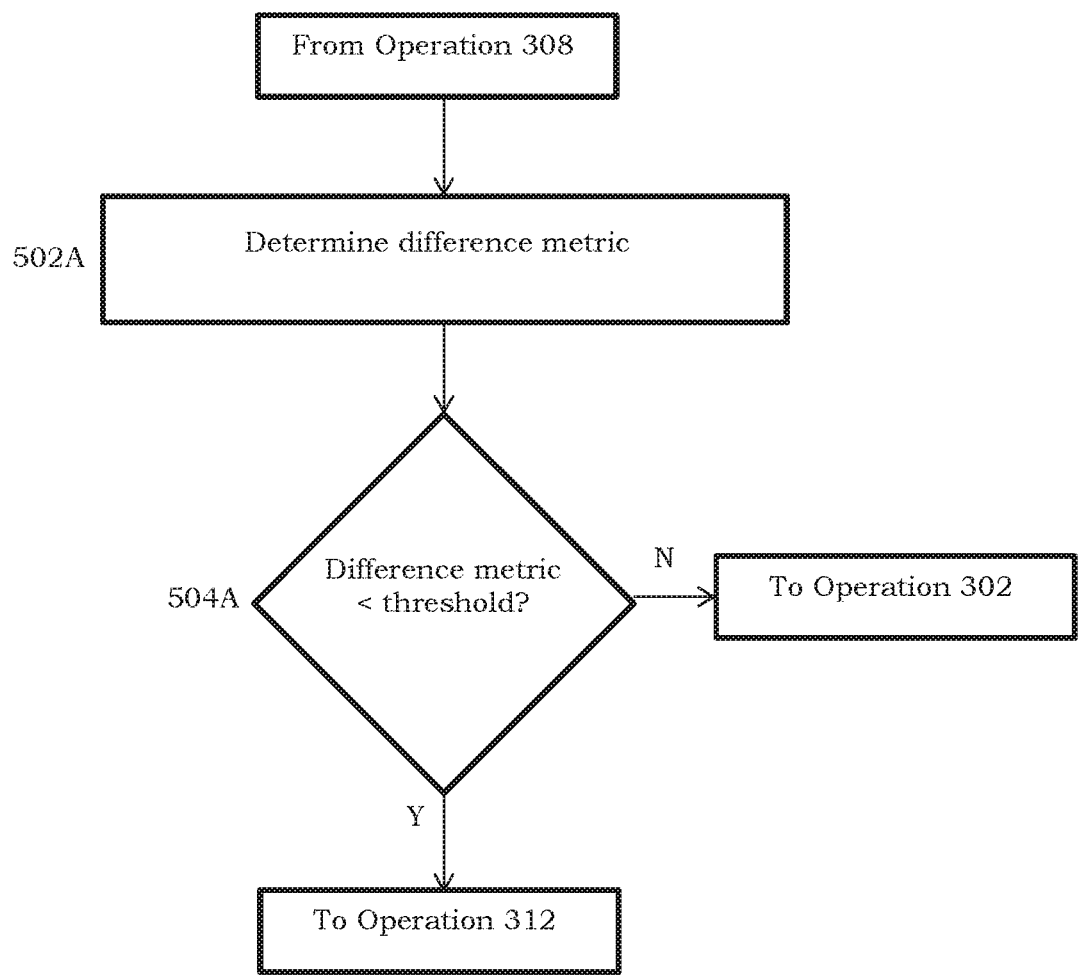
FIG. 5A is a flowchart of a method for determining whether the tone template matches the plurality of detected tones using a difference measurement, according to some example embodiments.
Figure 5B:
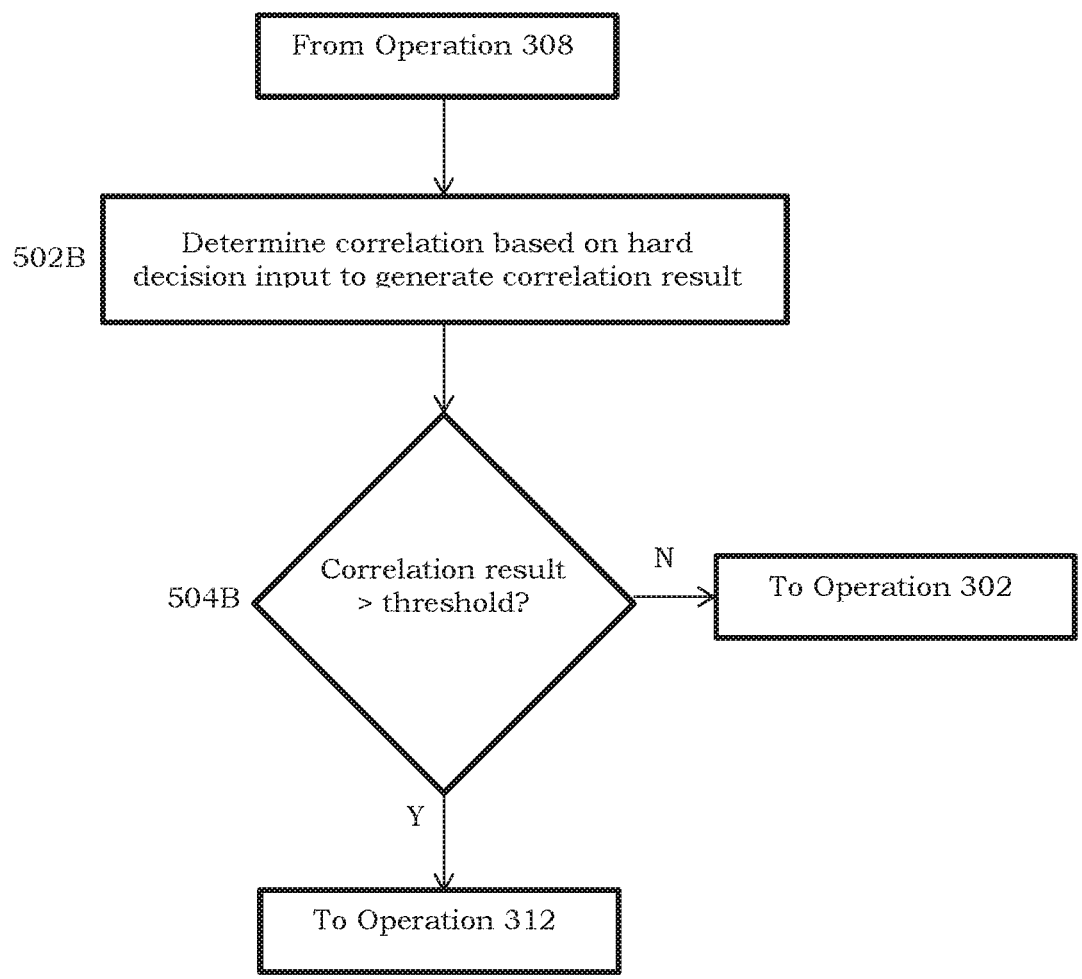
FIG. 5B is a flowchart of a method for determining whether the tone template matches the plurality of detected tones using a correlation algorithm, according to some example embodiments.

Referring to FIG. 3, according to some example embodiments, as discussed further in association with FIG. 5B, the determination may include using a correlation algorithm to determine a correlation metric between the tone template and the plurality of detected tones, and determining whether the correlation metric is greater than a defined threshold. The determination of the correlation metric may be based on a hard decision input of whether a tone of the tone template is found or not found at the particular time and frequency position in the plurality of detected tones.

Figure 5C:
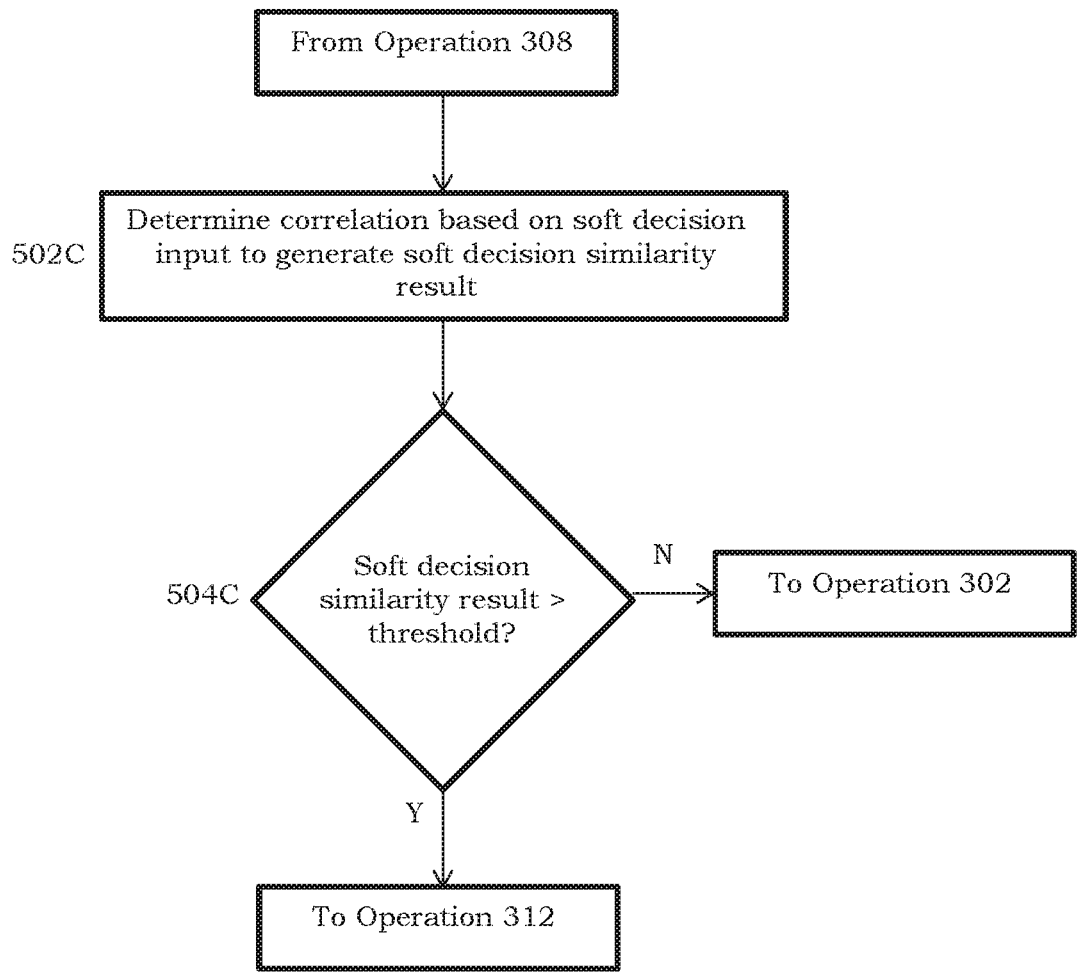
FIG. 5C is a flowchart of a method for determining whether the tone template matches the plurality of detected tones using a similarity measurement of intensity values, according to some example embodiments.

According to some example embodiments, as discussed further in association with FIG. 5C, the determination may include calculating a soft decision similarity metric between the tone template and the intensities of the plurality of detected tones, and determining whether the soft decision similarity metric is greater than a defined threshold. As discussed further above, the intensities of the plurality of detected tones correspond to the intensity of spectrum energy detected at the position in the time and frequency domains (also referred to herein as a "soft decision input"). Accordingly, the intensity values function as probabilities that a given time-frequency block includes a tone. According to some example embodiments, the calculation of the soft decision similarity metric may be performed by applying a correlation algorithm to continuous tone soft decision data (e.g., intensity values) corresponding to the plurality of detected tones.

If, in operation 310, it is determined that the tone template matches the plurality of detected tones, the method advances to operation 312. In operation 312, a valid frequency hopping sequence (e.g., valid paging sequence) is detected, after which the method ends. According to some example embodiments, the valid frequency hopping sequence corresponds to a Bluetooth paging signal. Otherwise, if, in operation 310, it is determined that the tone template does not match the plurality of detected tones, the method returns to operation 302 in which a new tone is selected from among the plurality of detected tones.

For example, if, in operation 310, it is determined that the tone template 404 as aligned in FIG. 4C does not match the plurality of detected tones 402, the method returns to operation 302 in which a new tone is selected from among the plurality of detected tones 402. FIG. 4D depicts an example scenario in which tone of the plurality of detected tones 402 associated with time period t2 is the newly selected tone. Given that the frequency of the newly selected tone is the same as the selected tone discussed in association with FIG. 4C, the same tone template 404 would be generated in operation 306. In operation 308, the tone template 404 would be aligned with the newly selected tone as depicted in FIG. 4D. With the sequence mask so aligned, the quantity of tones of the tone template not matched with a corresponding tone of the plurality of detected tones is 1 and the quantity of tones in the tone template is 4. Accordingly, the difference metric determined in operation 310 for the example scenario of FIG. 4D is ¼ or 0.25. If 0.25 is less than the defined threshold, the tone template is determined to match the plurality of detected tones. Otherwise, if 0.25 is greater than or equal to the defined threshold, the tone template is determined to not match the plurality of detected tones.

FIG. 5A is a flowchart of a method for determining whether the tone template matches the plurality of detected tones using a difference metric, according to some example embodiments. According to some example embodiments, the method of FIG. 5A is performed by a page scanning device similar to or the same as the page scanning device 200 of FIG. 2. According to some example embodiments, the operations discussed below in association with FIG. 5A correspond to operation 310 described above in association with FIG. 3. FIG. 5A will be discussed below in association with FIG. 3, redundant descriptions between FIGS. 3 and 5A may be omitted.

Following operation 308 described in association with FIG. 3, in operation 502A, a difference metric between the tone template and the plurality of detected tones corresponding to the time-frequency positions of the tone template is determined. According to some example embodiments, each tone of the tone template, and each tone of the plurality of detected tones, corresponds to a hard decision input, or binary indication, of whether a tone is found or not found at the particular time and frequency. According to some example embodiments, the difference metric may be a ratio of a quantity of tones of the tone template not matched with a corresponding tone of the plurality of detected tones, to a quantity of tones in the tone template. According to some example embodiments, the determination may include calculating a hard decision similarity metric between the tone template and the plurality of detected tones. For example, the hard decision similarity metric may be a ratio of a quantity of tones of the tone template successfully matched with a corresponding tone of the plurality of detected tones, to a quantity of tones in the tone template.

In operation 504A, the tone template is determined to match the plurality of detected tones when the difference metric is less than a defined, determined, or adaptively configured threshold. For example, the threshold may correspond to a quantity of tones within the tone template for which the corresponding tone of the plurality of detected tones is permitted to be absent and still determine a match. According to some example embodiments, tones corresponding to a paging signal may be absent within the plurality of detected tones due to noise. According to some example embodiments, the threshold may be defined, determined, or adaptively configured, according to a tradeoff between sensitivity and false positives. A lower threshold corresponds to fewer false positive determinations that the tone template matches the plurality of detected tones. In contrast, a higher threshold corresponds to higher sensitivity at the expense of increased potential for false alarms. Accordingly, the threshold may be defined, determined, or adaptively configured, based on priorities of a user or constraints of a particular application. After the determination is made of whether the tone template matches the plurality of detected tones in operation 504A, the method advances to operation 312 when the tone template matches the plurality of detected tones. Otherwise, the method returns to operation 302 when the tone template does not match the plurality of detected tones.

FIG. 5B is a flowchart of a method for determining whether the tone template matches the plurality of detected tones using a correlation algorithm, according to some example embodiments. According to some example embodiments, the method of FIG. 5B is performed by a page scanning device similar to or the same as the page scanning device 200 of FIG. 2. According to some example embodiments, the operations discussed below in association with FIG. 5B correspond to operation 310 described above in association with FIG. 3. FIG. 5B will be discussed below in association with FIG. 3, redundant descriptions between FIGS. 3 and 5B may be omitted.

Following operation 308 described in association with FIG. 3, in operation 502B, a correlation between the tone template and the plurality of detected tones corresponding to the time-frequency positions of the tone template is determined to generate a correlation result. According to some example embodiments, the correlation is determined using one of several correlation algorithms that would be known to one of skill in the art. The determination of the correlation metric may be based on a hard decision input of whether a tone is found or not found at the particular time and frequency in the plurality of detected tones In operation 504B, the tone template is determined to match the plurality of detected tones when the correlation result is greater than a defined, or determined, or adaptively configured threshold. According to some example embodiments, the threshold may be defined, determined, or adaptively configured, according to a tradeoff between sensitivity and false positives. A higher threshold corresponds to fewer false positive determinations that the tone template matches the plurality of detected tones. In contrast, a lower threshold corresponds to higher sensitivity at the expense of increased potential for false alarms. Accordingly, the threshold may be defined, determined, or adaptively configured, based on priorities of a user or constraints of a particular application. After the determination is made of whether the tone template matches the plurality of detected tones in operation 504B, the method advances to operation 312 when the tone template matches the plurality of detected tones. Otherwise, the method returns to operation 302 when the tone template does not match the plurality of detected tones.

FIG. 5C is a flowchart of a method for determining whether the tone template matches the plurality of detected tones using a similarity measurement of intensity values, according to some example embodiments. According to some example embodiments, the method of FIG. 5C is performed by a page scanning device similar to or the same as the page scanning device 200 of FIG. 2. According to some example embodiments, the operations discussed below in association with FIG. 5C correspond to operation 310 described above in association with FIG. 3. FIG. 5C will be discussed below in association with FIG. 3, redundant descriptions between FIGS. 3 and 5C may be omitted.

Following operation 308 described in association with FIG. 3, in operation 502C, a correlation between intensities of tones of the plurality of detected tones corresponding to the time-frequency positions of tones of the tone template is determined to generate a soft decision similarity result. According to some example embodiments, the soft decision similarity result is a soft decision similarity metric. According to some example embodiments, each tone of the tone template corresponds to a defined full intensity value, and each tone of the plurality of detected tones corresponds to an intensity value corresponding to the spectral energy detected at the respective time and frequency. According to some example embodiments, each intensity value functions as a probability of the existence of a tone where the full intensity value corresponds to a 100% probability. Accordingly, the soft decision similarity result may correspond to an overall amount of spectral energy detected in the tones of the plurality of detected tones corresponding to the time-frequency positions of the tones of the tone template. According to some example embodiments, the calculation of the soft decision similarity result, or soft decision similarity metric, may be performed by applying a correlation algorithm to continuous tone soft decision data (e.g., intensity values) included in the plurality of detected tones.

In operation 504C, the tone template is determined to match the plurality of detected tones when the soft decision similarity result is greater than a defined, determined, or adaptively configured threshold. According to some example embodiments, the threshold may be defined, determined, or adaptively configured, according to a tradeoff between sensitivity and false positives. A higher threshold corresponds to fewer false positive determinations that the tone template matches the plurality of detected tones. In contrast, a lower threshold corresponds to higher sensitivity at the expense of increased potential for false alarms. Accordingly, the threshold may be defined, determined, or adaptively configured, based on priorities of a user or constraints of a particular application. After the determination is made of whether the tone template matches the plurality of detected tones in operation 504C, the method advances to operation 312 when the tone template matches the plurality of detected tones. Otherwise, the method returns to operation 302 when the tone template does not match the plurality of detected tones.

Figure 6:
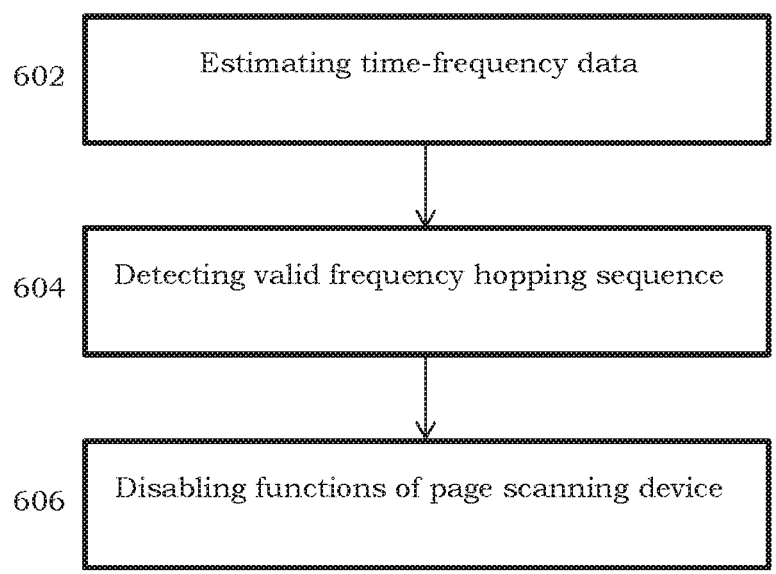
FIG. 6 is a flowchart of a method disabling page scanning device functions in response to valid frequency hopping sequence detection, according to some example embodiments.

FIG. 6 is a flowchart of a method for disabling page scanning device functions in response to valid frequency hopping sequence detection, according to some example embodiments. According to some example embodiments, the method of FIG. 6 is performed by a page scanning device similar to or the same as the page scanning device 200 of FIG. 2. FIG. 6 will be discussed below in association with FIGS. 2 and 4A-4D, redundant descriptions between FIGS. 2, 4A-4D and 6 may be omitted.

Referring to FIG. 6, in operation 602, time-frequency data is estimated based on detected spectral energy in an RF channel. According to some example embodiments, the RF channel may correspond to the whole or a part of the 2.4 ISM GHz band. The estimation of time-frequency data based on detected spectral energy is discussed further above in association with FIGS. 2 and 3.

In operation 604, a valid frequency hopping sequence is detected using the time-frequency data. According to some example embodiments, the valid frequency hopping sequence corresponds to a Bluetooth paging signal. According to some example embodiments, the Bluetooth paging signal is detected without decoding the paging packet corresponding to the valid frequency hopping sequence. Given that the paging packets are not decoded, the frequency resolution of the spectral estimates used to generate the time-frequency data may be reduced, thereby reducing computation time of the time-frequency data. According to some example embodiments, an increase in the amount of interference in the Bluetooth paging channel would not increase page scan latency but may reduce reliability in detecting the Bluetooth paging signal.

Using the tone template discussed in association with FIGS. 2-3, the Bluetooth paging signal may be detected using only a fraction of the time samples constituting the frequency hop because the time-frequency data on which the tone template is based corresponds to wideband, 80 MHz bandwidth of the entire RF channel. Accordingly, by detecting the Bluetooth paging signal using only a fraction of the time samples constituting the frequency hop, the page scan latency may be reduced.

Using the methods discussed in association with FIG. 3, the Bluetooth paging signal may be detected using a fraction of the page scan window used by conventional paging systems that perform interlaced scanning using two scan windows. In order to improve hopping sequence alignment latency, a first scan window uses a frequency of a first hopping train and a second scan window uses a frequency of a second hopping train. The paging device alternates between the two hopping trains. According to some example embodiments, when determining whether the tone template matches the plurality of detected tones, as discussed in association with operation 310, the plurality of detected tones includes tones associated with both the first hopping train and the second hopping train transmitted by the paging device (e.g., the paging device 104). Accordingly, by successfully detecting a valid frequency hopping sequence using the methods discussed in association with FIG. 3, the Bluetooth paging signal may be detected within a 3 ms window as compared to one or two scan windows of 11.25 ms of the above-described conventional paging systems.

As discussed further above, after the page scanning device 200 detects the first frequency hop, the page scanning device 200 may be synchronized with the paging device (e.g., paging device 104) transmitting the paging signals such that the page scanning device 200 may predict the subsequent frequency hops. By predicting the subsequent frequency hops, the page scanning device 200 is able to identify a paging signal without decoding paging packets.

In operation 606, one or more functions of the page scanning device 200 are disabled. According to some example embodiments, disabling one or more functions of the page scanning device 200 includes disabling one or more of the wideband receiver 202, the DPSC 204, the tone detector 206, the pulse characterizer 208, and the pattern detector 210, the narrowband receiver 212, the demodulator 214, the decoder 216 and/or the operations performed thereby. According to some example embodiments, the one or more functions of the page scanning device 200 may be disabled by the at least one processor 218.

According to some example embodiments, the one or more functions of the page scanning device 200 are disabled for a remainder of a page scan window in which the valid frequency hopping sequence is detected. By disabling the one or more functions of the page scanning device 200, the overall power consumption used to perform page scans may be reduced. According to some example embodiments, the one or more functions of the page scanning device 200 are disabled in intervals between blocks of samples used to generate a spectrum measurement. This duty cycle reduction reduces or eliminates the power consumed by the disabled function(s).

For example, referring to FIG. 4A, the expected hop sequence corresponding to the sequence mask 400 has a duration of 16 time periods (e.g., t1-t16). In conventional paging systems, the receiver is active for 16 time periods for each train of 16 frequencies corresponding to a Bluetooth paging signal. However, referring to FIGS. 4B-4D, using the methods described in association with FIG. 3, a valid paging sequence may be detected based on the plurality of detected tones 402 detected over a duration of 5 time periods (e.g., t1-t5). As discussed above, during the remaining 11 time periods of the duration of the expected hop sequence (e.g., t6-t16), and the second train of the paging signal, the one or more functions of the page scanning device 200 may be disabled. According to some example embodiments, by disabling the one or more functions of the page scanning device 200, spectrum estimates are not performed for a portion of the expected hop sequence. Therefore, using the methods described in association with FIG. 3, page scanning is performed with reduced power consumption in comparison to conventional paging systems.

According to some example embodiments, the length of the page scan window, and/or the length of the tone template, may be defined, determined, or selected based on a measured signal to noise ratio of the particular RF channel. A longer page scan window, or tone template, corresponds to higher reliability and would be useful in a channel having a low signal to noise ratio. However, a longer page scan window, or tone template, also corresponds to higher latency and energy consumption. Accordingly, the length of the page scan window, and/or the length of the tone template, may be selected based on priorities of a user or constraints of a particular application. According to some example embodiments, the page scan window may be shortened, thereby reducing page scan latency and increase the probability of successfully detecting the Bluetooth paging signal before page timeout. Such a page scan window may be useful in challenging radio conditions with high interference.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While some example embodiments have been particularly shown and described with reference to the figures, it will be understood by those of ordinary skill in the art that various changes in form and details may be made therein without departing from the spirit and scope as defined by the following claims.

What is claimed is:

1. A page scanning device, comprising:
a memory storing computer-readable instructions; and
at least one processor communicably coupled to the memory and configured to execute the computer-readable instructions to,
select a first tone among a plurality of detected tones,
first determine whether the first tone is included within an expected hop sequence to generate a first determination result,
generate a first tone template in response to the first determination result indicating that the first tone is included within the expected hop sequence,
align the first tone template with the plurality of detected tones based on the first tone,
second determine whether the first tone template matches the plurality of detected tones to generate a second determination result, and
detect a valid frequency hopping sequence in response to the second determination result indicating that the first tone template matches the plurality of detected tones.

2. The page scanning device according to claim 1, wherein the at least one processor is further configured to execute the computer-readable instructions to,
select a second tone among the plurality of detected tones, and
repeat the first determine, the generate, the align and the second determine, with respect to the second tone.

3. The page scanning device according to claim 1, wherein the at least one processor is further configured to execute the computer-readable instructions to,
select a second tone among the plurality of detected tones in response to determining that the first tone is not included within the expected hop sequence, and
repeat the first determine with respect to the second tone.

4. The page scanning device according to claim 1, wherein the at least one processor is further configured to execute the computer-readable instructions to,
third determine whether the first tone is included in a second tone template generated by the page scanning device,
first determine whether the first tone is included within the expected hop sequence only if the first tone is not included in the second tone template.

5. The page scanning device according to claim 1, wherein the at least one processor is further configured to execute the computer-readable instructions to second determine whether the first tone template matches the plurality of detected tones by:
calculating a difference metric between time-frequency positions of one or more tones included in the first tone template and time-frequency positions of the plurality of detected tones; and
determining that the first tone template matches the plurality of detected tones when the difference metric is less than a defined threshold.

6. The page scanning device according to claim 1, wherein the at least one processor is further configured to execute the computer-readable instructions to generate the first tone template to have two or more tones including a matched tone included within the expected hop sequence and corresponding to the first tone, and one or more additional tones included in the expected hop sequence, the two or more tones of the first tone template being aligned with respect to the matched tone and one another in the first tone template according to an order and timing of the expected hop sequence.

7. The page scanning device according to claim 6, wherein the one or more additional tones sequentially follow the matched tone in the expected hop sequence.

8. The page scanning device according to claim 6, wherein the one or more additional tones do not sequentially follow the matched tone in the expected hop sequence.

9. The page scanning device according to claim 6, wherein the at least one processor is further configured to execute the computer-readable instructions to align the first tone template with the plurality of detected tones by establishing an association in time and frequency domains between a position of the first tone among the plurality of detected tones and a position of the matched tone among the two or more tones of the first tone template.

10. The page scanning device according to claim 1, wherein the valid frequency hopping sequence and the expected hop sequence each correspond to a paging signal.

11. The page scanning device according to claim 10, wherein the paging signal is a Bluetooth paging signal.

12. The page scanning device according to claim 1, wherein the first tone template includes fewer tones than the expected hop sequence.

13. The page scanning device according to claim 12, wherein a quantity of tones in the first tone template is defined according to an amount of interference in a channel over which the plurality of detected tones is received.

14. The page scanning device according to claim 1, wherein the expected hop sequence is based on a Bluetooth address of the page scanning device.

15. The page scanning device according to claim 1, wherein the plurality of detected tones is received via a channel spanning more than one Bluetooth channel, up to 80 MHz in bandwidth.

16. The page scanning device according to claim 1, wherein the at least one processor is further configured to execute the computer-readable instructions to,
detect a Bluetooth paging signal included in the plurality of detected tones based on the valid frequency hopping sequence, the Bluetooth paging signal being detected without decoding a paging packet corresponding to the valid frequency hopping sequence.

17. The page scanning device according to claim 16, wherein the at least one processor is further configured to execute the computer-readable instructions to detect the Bluetooth paging signal over one or more time periods representing a detection portion of a page scanning window.

18. The page scanning device according to claim 17, wherein the at least one processor is further configured to execute the computer-readable instructions to,
disable one or more functions of the page scanning device during a remaining portion of the page scanning window exclusive of the detection portion of the page scanning window.

19. A non-transitory computer-readable medium storing instructions that, when executed by at least one processor, cause the at least one processor to:
select a first tone among a plurality of detected tones,
first determine whether the first tone is included within an expected hop sequence to generate a first determination result,
generate a tone template in response to the first determination result indicating that the first tone is included within the expected hop sequence,
align the tone template with the plurality of detected tones based on the first tone,
second determine whether the tone template matches the plurality of detected tones to generate a second determination result, and
detect a valid frequency hopping sequence in response to the second determination result indicating that the tone template matches the plurality of detected tones.

20. A method performed by a page scanning device, the method comprising:
selecting a first tone among a plurality of detected tones;
first determining whether the first tone is included within an expected hop sequence to generate a first determination result;
generating a tone template in response to the first determination result indicating that the first tone is included within the expected hop sequence;
aligning the tone template with the plurality of detected tones based on the first tone;
second determining whether the tone template matches the plurality of detected tones to generate a second determination result; and
detecting a valid frequency hopping sequence in response to the second determination result indicating that the tone template matches the plurality of detected tones.

* * * * *